Patented July 9, 1929.

1,720,144

UNITED STATES PATENT OFFICE.

GEORGE FREDRIC OLSEN, OF LOS ANGELES, CALIFORNIA.

RECOVERY OF ENTRAINED OILS FROM CLAY.

No Drawing.   Application filed January 22, 1927. Serial No. 162,942.

My invention relates to the art of filtering petroleum lubricating oils in filter presses for the removal therefrom of pulverized clays or other adsorbent bodies which have previously been intermixed with such oils to decolorize or purify them, in which procedure the clay is retained on the filter cloth in the form of a layer or so-called cake.

My invention relates to the recovery from such cakes of a valuable quantity of oil which is always entrained therein, by such means and in such manner as to render the recovered oil immediately useful and valuable without further processing.

My invention further relates to a manner of cooling the filter press cakes before the press is opened for the discharge of the spent clay, enabling filtration to be conducted at a higher temperature than has hitherto been feasible.

In purifying and decolorizing oils by the so-called "contact process" a suitable clay or other adsorbent body is finely pulverized and intermixed with the oil, the mixture heated to promote the reaction, and the hot mixture pumped through any of the well known types of filter press or any other suitable filtering medium, by which a separation of the spent adsorbent from the purified oil is effected. In this operation, which is well known and understood in the art, oil free from clay or other solid passes through the cloth or other porous medium with which the plates of the press are covered, while the pulverulent solids originally contained in the oil are retained on such medium in the form of a layer or cake.

As the cake increases in thickness its resistance to the passage of oil increases until it reaches the capacity of the press pump to create or of the press body to withstand the pressure. At such point the filtration is discontinued and the cake, after suitable treatment, withdrawn from the press.

At the end of the filtration step the cake necessarily retains considerable oil, up to half or more of its total weight, and as this oil is finished oil and has had expended on it all the costs and charges incident to the refining process it is too valuable to be wasted, and many attempts have been made to recover it but hitherto without any great measure of success. At this point it may be stated that the oil retained in the cake is held in two quite distinct conditions. A minor portion is held in the clay grain itself, being adsorbed and absorbed by the pores of such grain; the major portion is held in the interstices between the grains, and it is to the recovery of this interstitial or entrained oil that my invention is directed.

The most common method of recovering oil from the cake is to blow air through it until no more oil is brought to the discharge side of the filter. This method is simple and cheap but has two serious drawbacks: The first, that none of the absorbed oil and only a relatively small part of the interstitial oil are removed, the second, that such oil as is recovered in this manner is seriously depreciated in color and odor by the oxidizing effect of the air on the hot oil. The failure to remove all the entrained oil is due to the tendency of the air current to seek the path of least resistance through the cake. By the elimination of a portion of the oil the grains which compose the cake are allowed to come closer to each other, causing shrinkage of the cake in all three directions, this shrinkage opening up cracks or channels through which the air passes without resistance. A cake treated in this manner, particularly if the oil contained therein be of high viscosity, will usually be dry on the face at which the air enters and on the faces of the cracks, and wet inside the shrinkage blocks.

Another well known method is to first drain out all unfiltered oil and thereafter to force gasoline or other light petroleum distillate into the press and through the cake, this gasoline dissolving and removing some of the absorbed oil and, theoretically, all of the entrained oil. In practice the entrained oil is not all removed, as the gasoline passing through the least dense portions of the cake effects a complete removal of the oil from such portions only, thereby setting up a severe shrinkage and opening channels through which the gasoline thereafter bypasses, so that the remaining portions of the cake are not cleansed at all. Further, if the cake be hot, as is usually the case, gasoline has a strong tendency to dissolve color bodies as well as oil from the clay grain, and on removal of the gasoline from the recovered oil these color bodies are left behind in the oil, strongly depreciating its value. Further, the press and its connections are filled with distillate having a very low flash point, and in order to protect the oil passing through the press in the next cycle, the press must be thoroughly cleaned and dried after filling it with gasoline. And finally, when the oil is recovered as a solution in gasoline, such solution must be distilled to separate the gasoline from the oil, an operation entailing considerable expense and having a detrimental effect on the color of the recovered oil.

I have discovered that by using a lubricating oil of low viscosity and relatively little value, for displacing the entrained oil from the cake, such entrained oil may be completely recovered, without depreciation of its value, and in such condition that it may be used and sold without any further processing such as a separation of the low viscosity oil from the recovered oil. At the same time a desirable cooling of the cake is accomplished, and such other useful and valuable results as will appear from the following description.

In the manufacture of lubricating oils from crude petroleum there is almost always an overproduction of the grade of oil known commercially as non-viscous neutral, a product lying intermediate between the heavier fuel distillates (such as gas-oil) and the lighter commercial lubricants (such as light machine or motor oils). This product, when refined, has a satisfactory color and odor and a fair flash test, but is of too low viscosity to permit its use as a lubricant except when it is blended with oils of higher viscosity. Where there exists, as is usually the case, an excessive production of this grade of oil above what can be used for blending, the excess quantity is useless except as fuel, for which purpose its commercial value is very small.

In applying my invention I proceed in the following manner. I first purify a quantity of neutral oil of about 100 viscosity, Saybolt universal at 100° F., or of a somewhat higher or lower viscosity depending on what material is the most readily available at the least cost. The principal requirements are that the oil should be free from any odor foreign to that of refined lubricating oil (which it would have if, for instance, any of the heavier kerosene were run into it) and that the flash test approximate that of a light lubricating oil, or say 300° F. Such oils may be as low in viscosity as 75 or 80 seconds, and it should be said that no particular viscosity is required for the successful application of my invention, the above said viscosity of 100 seconds being illustrative only.

The filtration of the lubricating oil from the clay or other adsorbent which it contains being carried out in any ordinary or preferred manner, the stage in the filtration cycle is reached at which it is no longer desirable to force more oil through the cake which has accumulated. At this point the feeding of lubricating oil into the press is discontinued.

I now begin to feed to the press the non-viscous neutral oil above described, preferably with a pump used exclusively for that purpose rather than the pump used for feeding the oil-clay mixture, applying sufficient pressure to obtain a small stream of filtrate. At this point the filtrate is diverted from the tank into which the lubricating oil had been received into another tank used only for receiving a mixture of lubricating oil and non-viscous oil.

A short time after beginning to feed the non-viscous oil to the press the color and the viscosity of the filtrate will change appreciably, showing that the non-viscous oil has displaced a portion of the lubricating oil from the press chamber and the cakes.

At this stage it is desirable, though not essential, to allow the oil to "soak" or remain at rest for a short time, say five minutes, to allow the non-viscous oil to completely permeate the cake and intermix with all the higher viscosity lubricating oil entrained in such cake. Either after this soaking, or immediately after filling the press in case the soaking step is not used, further quantities of the non-viscous neutral are slowly fed into the press, and the feed continued until the oil flowing from the filter discharge has the same gravity or viscosity or color (whichever means of comparison be the most readily made) showing that all the entrained oil has been removed from the cake. Before opening the press for the removal of the cleaned cake, it is desirable to blow air through the press to remove as much as possible of the non-viscous oil from the cakes and from the press itself, so that it will be clean and ready for the next filtration cycle.

The non-viscous neutral may be either hot or cold when applied to the cake, according to conditions. When the press is being used at high temperatures there will be sufficient heat in the press and the cake to keep the viscous oil fairly fluid, and it is then preferable to use a cold non-viscous oil, as by so doing the temperature of the cake is reduced to such an extent that there is no danger of the cake igniting on opening of the press, a difficulty which is often encountered when the press is opened directly after a hot filtration. On the other hand if the filtration is being conducted at a relatively low temperature it may be desirable to slightly pre-heat the non-viscous oil, up to say 200° F., to increase its solvent action on the entrained oil.

The first runnings from the press after the introduction of the non-viscous oil will consist of almost undiluted oil of the character being treated, the non-viscous oil apparently displacing the oil entrained in the cake and forcing it ahead without material intermixture. As the application of non-viscous oil continues a mixture of the two oils will appear, and the viscosity of this mixture will drop continuously until, at the moment when the entrained oil is entirely displaced, it reaches the viscosity of the non-viscous oil. If the first runnings from the press, together with a suitable proportion of the after-runnings, be collected in a suitable receptacle and thoroughly blended, a mixed oil will be obtained having physical properties intermediate between those of the non-viscous oil and of the viscous oil, and suitable for use as a light or medium machine or motor oil without further treatment of any kind.

As the first runnings from a single displacement operation of the character above described may not give exactly the properties desired in the finished blend, it is desirable, though not essential, to so arrange the press connections that the non-viscous oil may be used more than once for displacing and intermixing with the heavier oil entrained in the cake. Thus I prefer to provide three tanks for holding non-viscous oil, one to receive the first runnings from the press after the introduction of the non-viscous oil, one to receive the after-runnings, and one to hold a supply of unused non-viscous oil. Each of these tanks is so connected that its contents may be pumped through the press at will. In case the oil accumulating in the first-runnings tank is below the viscosity required for the blend, it may be pumped through the press as a first wash for one or more batches of fresh cake, thereby loading it with an increasing proportion of recovered oil, while the oil accumulating in the after-runnings tank is cycled in the same manner and is diverted into the first runnings tank only when its viscosity approaches that required for the blend, and finally the unused oil is passed through the press in small quantity to displace any traces of mixture remaining therein.

While the press cake after washing with the non-viscous oil and even after blowing the cake with air will still retain some oil, the quantity of oil so remaining will be less than will remain had the original cake been so blown, because of the lower viscosity of the oil with which the washed cake is filled. Further, channelling of the cake is almost or quite avoided, because of the much lower shrinkage incident to the displacement of viscous oil with an oil of lower viscosity, and still further, and most important of all, such oil as is finally retained in the spent and washed cake when it is discharged from the press will be, not the valuable finished lubricating oil which it originally held, but a non-viscous oil which, as above said, is usually an incidental and undesired product of the fractionating of the crude oil, and of little commercial value.

In the attached claims, where reference is made to "entrained oil" the words will be understood to mean, a mineral lubricating oil mechanically retained in the interstices of a mass or cake of powdered solid material which has been utilized for decolorizing or otherwise purifying the oil from which the cake was derived. The words "viscous oil" will be understood to mean, a mineral lubricating oil having a viscosity on the Saybolt universal viscometer of 150 seconds or over at 100° F. The words "less viscous oil" will be understood to mean, a mineral lubricating oil having a viscosity on the Saybolt universal viscometer of less than 150 seconds and over 75 seconds at 100° F.

I claim as my invention:

1. The method of recovering lubricating oil having a Saybolt universal viscosity in excess of 150 seconds at 100° F. from a filter press cake in which said oil is entrained, comprising the step of forcing through said cake, in place in the press in which said cake was originally formed, a lubricating oil having a viscosity not less than 75 seconds nor greater than 150 seconds Saybolt universal.

2. The method of recovering lubricating oil having a Saybolt universal viscosity in excess of 150 seconds at 100° F. from a filter press cake in which said oil is entrained, comprising the steps of forcing through said cake, in place in the press in which said cake was originally formed, a lubricating oil having a viscosity not less than 75 seconds nor greater than 150 seconds Saybolt universal, and of mingling the effluent oils for the production of a lubricating oil of intermediate viscosity.

3. The method of recovering lubricating oil having a Saybolt universal viscosity in an excess of 150 seconds at 100° F. from a filter press cake in which said oil is entrained, comprising the step of forcing through said cake, in place in the press in which said cake was originally formed, a lubricating oil having a viscosity not less than 75 seconds nor greater than 150 seconds Saybolt universal in quantity only sufficient to displace said entrained oil from the cake.

4. The method of recovering entrained lubricating oil from a mass of powdered solid material which comprises: forcing through such mass containing viscous lubricating oil a mixture of said viscous lubricating oil with a less viscous lubricating oil, said mixture resulting from a previous operation of the same character, and thereafter forcing through the said mass a further quantity of the less viscous lubricating oil.

5. The method of recovering entrained lubricating oil from a mass of powdered solid material which comprises: forcing through such mass containing viscous lubricating oil a mixture of said viscous lubricating oil with a less viscous lubricating oil, said mixture resulting from a previous operation, mingling the effluents from such mass for the production of a mixed lubricating oil of intermediate viscosity, and thereafter forcing through the said mass a quantity of the less viscous lubricating oil sufficient to displace any remaining viscous lubricating oil from such mass.

In witness that I claim the foregoing I have hereunto subscribed my name this 14 day of January, 1927.

GEORGE FREDRIC OLSEN.